(12) United States Patent
Watanabe

(10) Patent No.: US 10,176,512 B2
(45) Date of Patent: Jan. 8, 2019

(54) PROCESSING ELECTRONIC DATA ACROSS NETWORK DEVICES

(71) Applicant: Kaoru Watanabe, Sunnyvale, CA (US)

(72) Inventor: Kaoru Watanabe, Sunnyvale, CA (US)

(73) Assignee: RICOH COMPANY, LTD., Tokyo (JP)

( * ) Notice: Subject to any disclaimer, the term of this patent is extended or adjusted under 35 U.S.C. 154(b) by 299 days.

(21) Appl. No.: 15/089,897

(22) Filed: Apr. 4, 2016

(65) Prior Publication Data

US 2016/0225066 A1 Aug. 4, 2016

Related U.S. Application Data

(63) Continuation of application No. 14/042,291, filed on Sep. 30, 2013.

(51) Int. Cl.
| | | |
|---|---|---|
| G06Q 30/06 | (2012.01) | |
| G06Q 40/00 | (2012.01) | |
| G06F 17/24 | (2006.01) | |
| G06F 17/30 | (2006.01) | |
| G06Q 10/08 | (2012.01) | |

(52) U.S. Cl.
CPC ......... *G06Q 30/0635* (2013.01); *G06F 17/24* (2013.01); *G06F 17/30265* (2013.01); *G06Q 30/0637* (2013.01); *G06Q 40/128* (2013.12)

(58) Field of Classification Search
USPC .......................................................... 705/26
See application file for complete search history.

(56) References Cited

U.S. PATENT DOCUMENTS

| | | |
|---|---|---|
| 7,801,878 B2 | 9/2010 | Hayes et al. |
| 2003/0074269 A1 | 4/2003 | Viswanath |
| 2003/0195836 A1 | 10/2003 | Hayes et al. |
| 2004/0049459 A1 | 3/2004 | Philliou et al. |
| 2005/0177507 A1 | 8/2005 | Bandych et al. |
| 2007/0219880 A1* | 9/2007 | Stone ................... G06Q 10/087 705/30 |

(Continued)

OTHER PUBLICATIONS

U.S. Appl. No. 14/042,291, filed Sep. 30, 2013, Office Action, dated Dec. 31, 2014.

(Continued)

*Primary Examiner* — Garcia Ade
(74) *Attorney, Agent, or Firm* — Hickman Palermo Becker Bingham LLP; Edward A. Becker

(57) ABSTRACT

An approach is provided for processing electronic data across network devices. One or more text fields represented in image data that represents an electronic document are compared to data from a first external system. If the one or more text fields represented in the image data do not match the data from the first external system, then the one or more text fields represented in the image data are designated for special processing. If the one or more text fields represented in the image data match the data from the first external system, then the electronic document is designated as verified. The approach also includes the ability for a user to supplement image data with additional data, such as codes used by business organizations, and for automatic correction of errors in text fields using data maintained by the first external system.

20 Claims, 10 Drawing Sheets

(56) References Cited

U.S. PATENT DOCUMENTS

2013/0236111 A1* 9/2013 Pintsov .............. G06K 9/00483
382/224
2014/0337190 A1 11/2014 Watanabe et al.

OTHER PUBLICATIONS

U.S. Appl. No. 14/042,291, filed Sep. 30, 2013, Office Action, dated Nov. 4, 2015.
U.S. Appl. No. 14/042,291, filed Sep. 30, 2013, Final Office Action, dated May 6, 2015.

\* cited by examiner

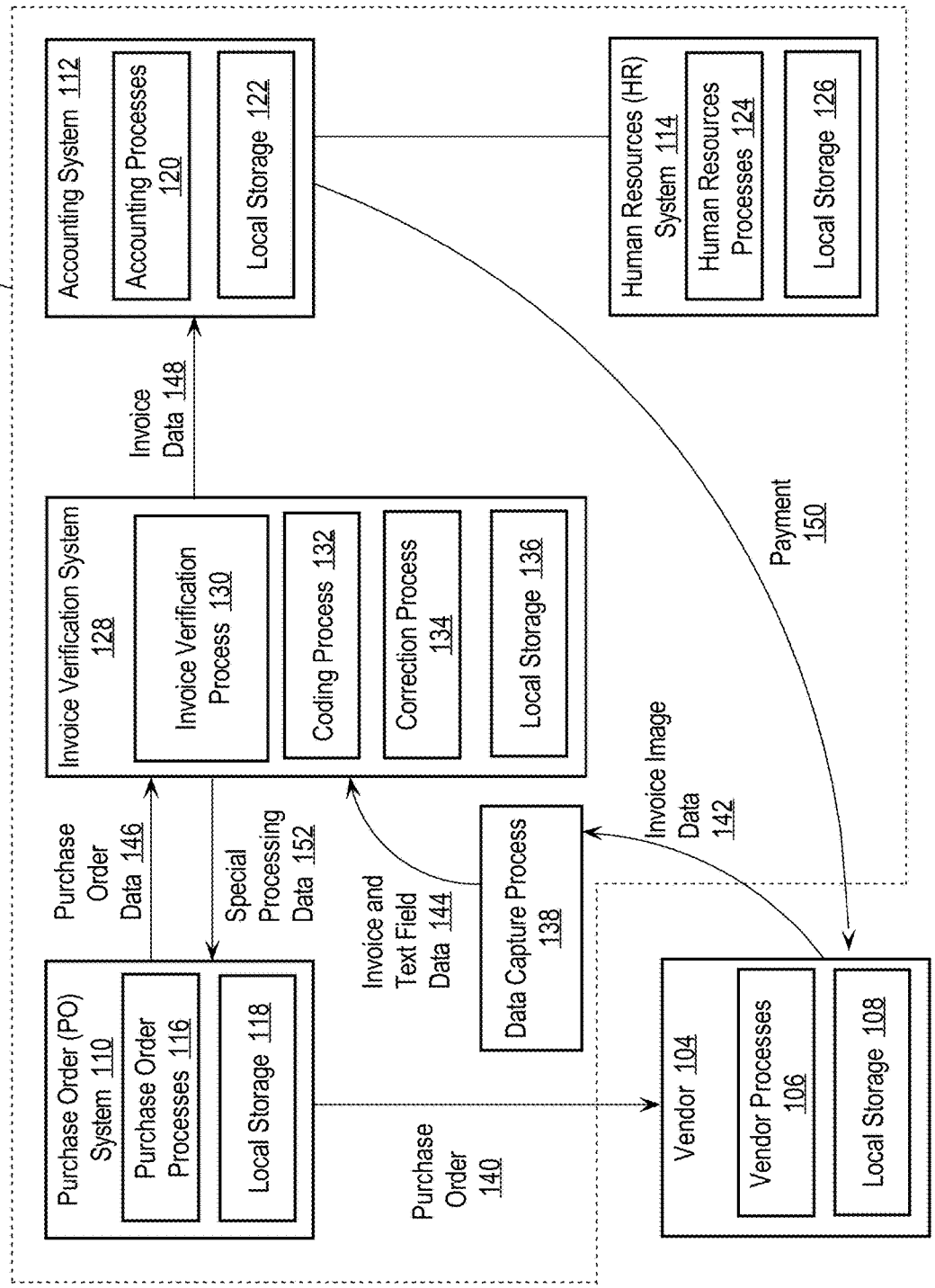

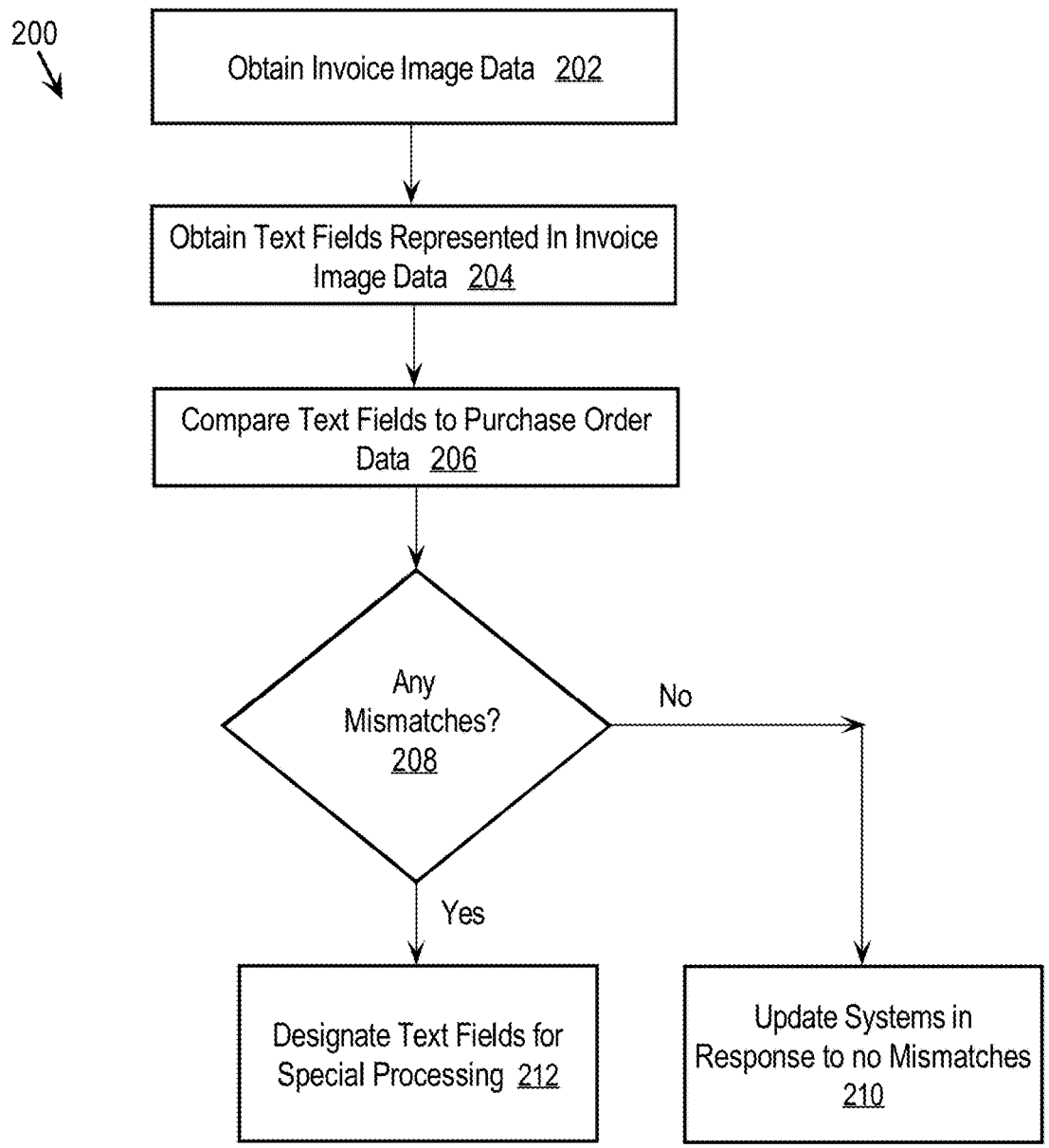

FIG. 3A

Invoice Data

| P.O.# | Invoice No. | invoice date | Total amount | Freight cost |
|---|---|---|---|---|
| 29012342 | R12354 | 2/4/2013 | $ 200.00 | $ 95.23 |
| 30123453 | A123838 | 4/1/2013 | $ 354,885.00 | $ 85.23 |
| 31234564 | 45332453 | 1/13/2013 | $ 56.89 | $ 45.78 |
| 27901231 | 12-34390 | 1/15/2013 | $ 85.23 | $ 96.23 |
| 10123455 | 456-5987 | 1/2/2013 | $ 1,235.00 | $ 20.00 |
| 11234566 | 45-5955 | 3/6/2013 | $ 8,955.00 | $ 15.00 |
| 13456788 | 8-959452 | 4/5/2013 | $ 4,354,540.00 | $ 55.00 |
| 12345677 | 1-235645 | 11/3/2013 | $ 45,654.00 | $ 12.00 |
| 21234565 | 13-468985 | 1/13/2013 | $ 1,650.00 | $ 185.00 |
| 22345676 | 19-56489 | 7/23/2013 | $ 21.00 | $ 85.21 |
| 23456787 | 18-58455 | 7/2/2013 | $ 85.24 | $ 936.25 |
| 24567898 | 58-8989 | 1/5/2013 | $ 78.25 | $ 73.12 |
| 14567899 | 15-457893 | 2/26/2013 | $ 585.00 | $ 150.00 |
| 15679010 | 14-5656 | 1/27/2013 | $ 125.00 | $ 80.00 |
| 16790121 | 419-5656 | 2/14/2013 | $ 125.32 | $ 65.00 |
| 19012343 | 48-78989 | 4/21/2013 | $ 896.00 | $ 22.12 |
| 20123454 | 14-789456 | 5/3/2013 | $ 1,520.00 | $ 15.25 |
| 2345678 | 8456789 | 3/8/2011 | $ 800.00 | $ 160.00 |
| 3456789 | R1525-1 | 4/9/2011 | $ 45,565.00 | $ 1,232.00 |
| 4567900 | A125455 | 5/8/2011 | $ 888.00 | $ 1,800.00 |
| 5679011 | V45687 | 6/8/2011 | $ 132.00 | $ 1,556.00 |
| 6790122 | 52-45678 | 9/12/2011 | $ 83.00 | $ 2,500.00 |
| 7901233 | 82-56459 | 11/8/2011 | $ 561,231.00 | $ 489.00 |
| 9012344 | 85-45678 | 12/8/2011 | $ 2,132.00 | $ 4,660.00 |
| 25679009 | 10-58955 | 2/3/2013 | $ 12.25 | $ 78.00 |
| 123456 | 58-5989 | 1/2/2011 | $ 200.00 | $ 120.00 |
| 1234567 | 15-56565 | 2/5/2011 | $ 450.00 | $ 150.00 |
| 26790120 | 15956 | 1/22/2013 | $ 15.59 | $ 85.12 |
| 27901231 | T321256 | 1/30/2013 | $ 17.25 | $ 42.16 |
| 17901232 | 4895-5656 | 3/1/2013 | $ 135.00 | $ 24.25 |

FIG. 3B

Purchase Order Data

| P.O. No. | Description | Part # | Unit Price | Qty | Total Amount |
|---|---|---|---|---|---|
| 123456 | | | $ 4.44 | 45 | $ 200.00 |
| 1234567 | | | $ 0.10 | 4,521 | $ 450.00 |
| 2345678 | | | $ 6.56 | 122 | $ 800.00 |
| 3456789 | | | $ 214.93 | 212 | $ 45,565.00 |
| 4567900 | | | $ 19.83 | 23 | $ 456.00 |
| 5679011 | | | $ 9,770.60 | 5 | $ 48,853.00 |
| 6790122 | | | $ 0.04 | 12,321 | $ 485.00 |
| 7901233 | | | $ 10.16 | 12,121 | $ 123,123.00 |
| 9012344 | | | $ 0.01 | 1,212 | $ 8.00 |
| 10123455 | | | $ 39.27 | 22 | $ 864.00 |
| 11234566 | | | $ 25.14 | 225 | $ 5,656.00 |
| 12345677 | | | $ 0.00 | 25,550 | $ 51.00 |
| 13456788 | | | $ 0.00 | 21,232 | $ 55.00 |
| 14567899 | | | $ 0.20 | 4,390 | $ 888.00 |
| 15679010 | | | $ 0.02 | 4,890 | $ 83.00 |
| 16790121 | | | $ 9.48 | 225 | $ 2,132.00 |
| 17901232 | | | $ 22.45 | 25,000 | $ 561,231.00 |
| 19012343 | | | $ 0.01 | 54,564 | $ 312.00 |
| 20123454 | | | $ 0.00 | 564,654 | $ 132.00 |
| 21234565 | | | $ 0.20 | 23,132 | $ 4,565.00 |
| 22345676 | | | $ 2.41 | 2,343 | $ 5,653.00 |
| 23456787 | | | $ 0.04 | 53,321 | $ 2,302.00 |
| 24567898 | | | $ 0.26 | 12,343 | $ 3,213.00 |
| 25679009 | | | $ 4.09 | 5,656 | $ 23,123.00 |
| 26790120 | | | $ 5,697.19 | 564 | $ 3,213,213.00 |
| 27901231 | | | $ 42.35 | 312 | $ 13,213.00 |
| 29012342 | | | $ 66.09 | 35 | $ 2,313.00 |
| 30123453 | | | $ 518.08 | 685 | $ 354,885.00 |
| 31234564 | | | $ 14.36 | 86 | $ 1,235.00 |

FIG. 3C

Matching Matrix

| Invoice# | date | TTL Amount | P.O.# | MATCH |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

Reconcile 302

FIG. 3D

Matching Matrix

| Invoice # | date | TTL Amount | P.O. # | MATCH |
|---|---|---|---|---|
| 58-5989 | 40545 | 200 | 123456 | MATCH |
| 15-56565 | 40579 | 450 | 1234567 | MATCH |
| 8456789 | 40610 | 800 | 2345678 | MATCH |
| R1525-1 | 40642 | 45565 | 3456789 | MATCH |
| A125455 | 40671 | 888 | 4567900 | NO |
| V45687 | 40702 | 132 | 5679011 | NO |
| 52-45878 | 40798 | 83 | 6790122 | NO |
| 82-58459 | 40855 | 561231 | 7901233 | NO |
| 85-45878 | 40885 | 2132 | 9012344 | NO |
| 456-5987 | 41276 | 1235 | 10123455 | NO |
| 45-5955 | 41339 | 8955 | 11234566 | NO |
| 1-235645 | 41581 | 45654 | 12345677 | NO |
| 8-959452 | 41369 | 4354540 | 13456788 | NO |
| 15-457893 | 41331 | 585 | 14567899 | NO |
| 14-5656 | 41301 | 125 | 15679010 | NO |
| 419-5656 | 41319 | 125.32 | 16790121 | NO |
| 4895-5656 | 41334 | 135 | 17901232 | NO |
| 48-78989 | 41385 | 896 | 19012343 | NO |
| 14-789456 | 41397 | 1520 | 20123454 | NO |
| 13-468985 | 41287 | 1650 | 21234565 | NO |
| 19-58489 | 41478 | 21 | 22345676 | NO |
| 18-58455 | 41457 | 85.24 | 23456787 | NO |
| 58-8989 | 41279 | 78.25 | 24567898 | NO |
| 10-58955 | 41308 | 12.25 | 25679009 | NO |
| 15956 | 41296 | 15.59 | 26790120 | NO |
| 12-34390 | 41289 | 85.23 | 27901231 | NO |
| 812354 | 41309 | 200 | 29012342 | NO |
| A123838 | 41365 | 354885 | 30123453 | MATCH |
| 45332453 | 41287 | 56.89 | 31234564 | NO |

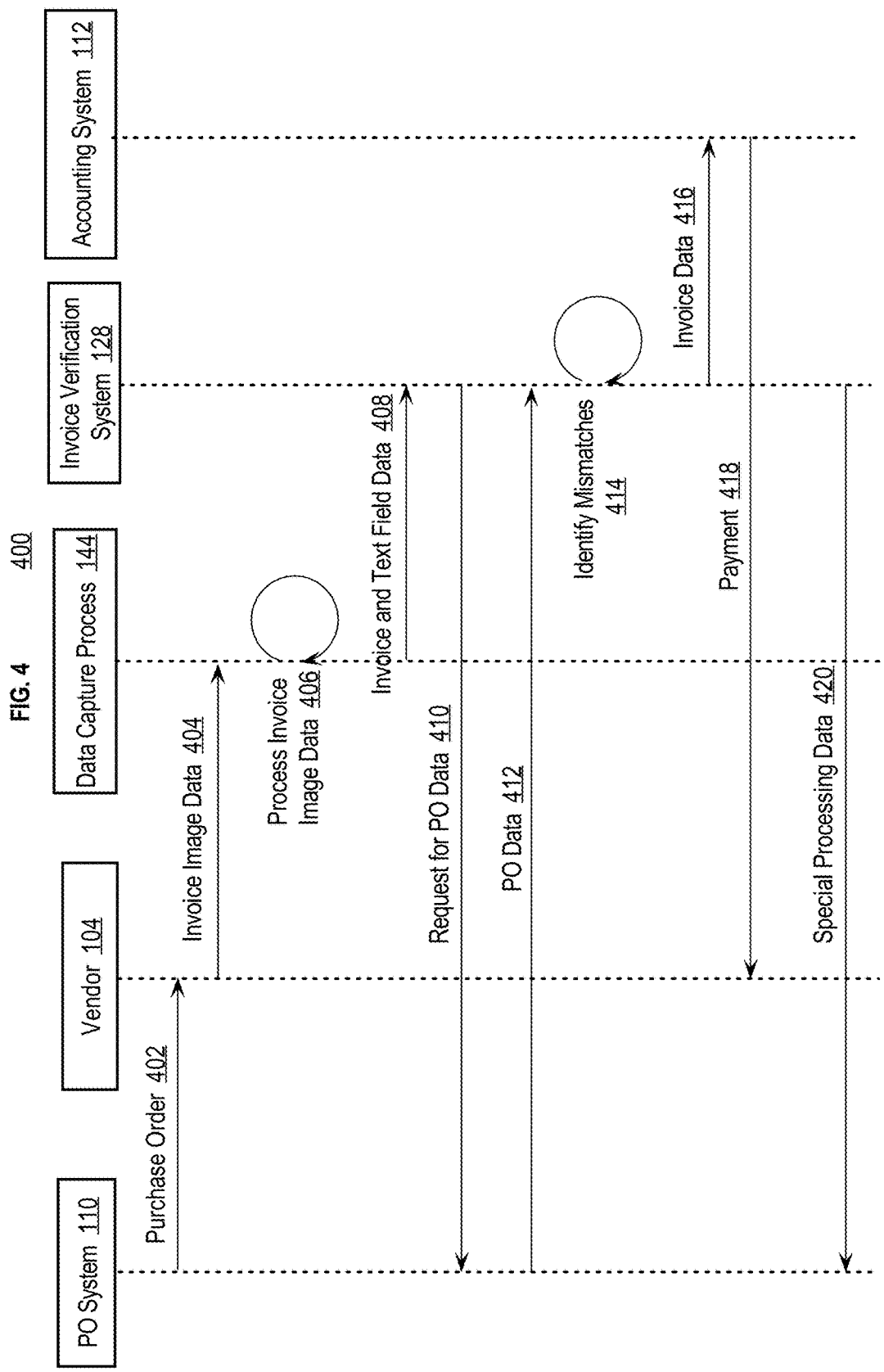

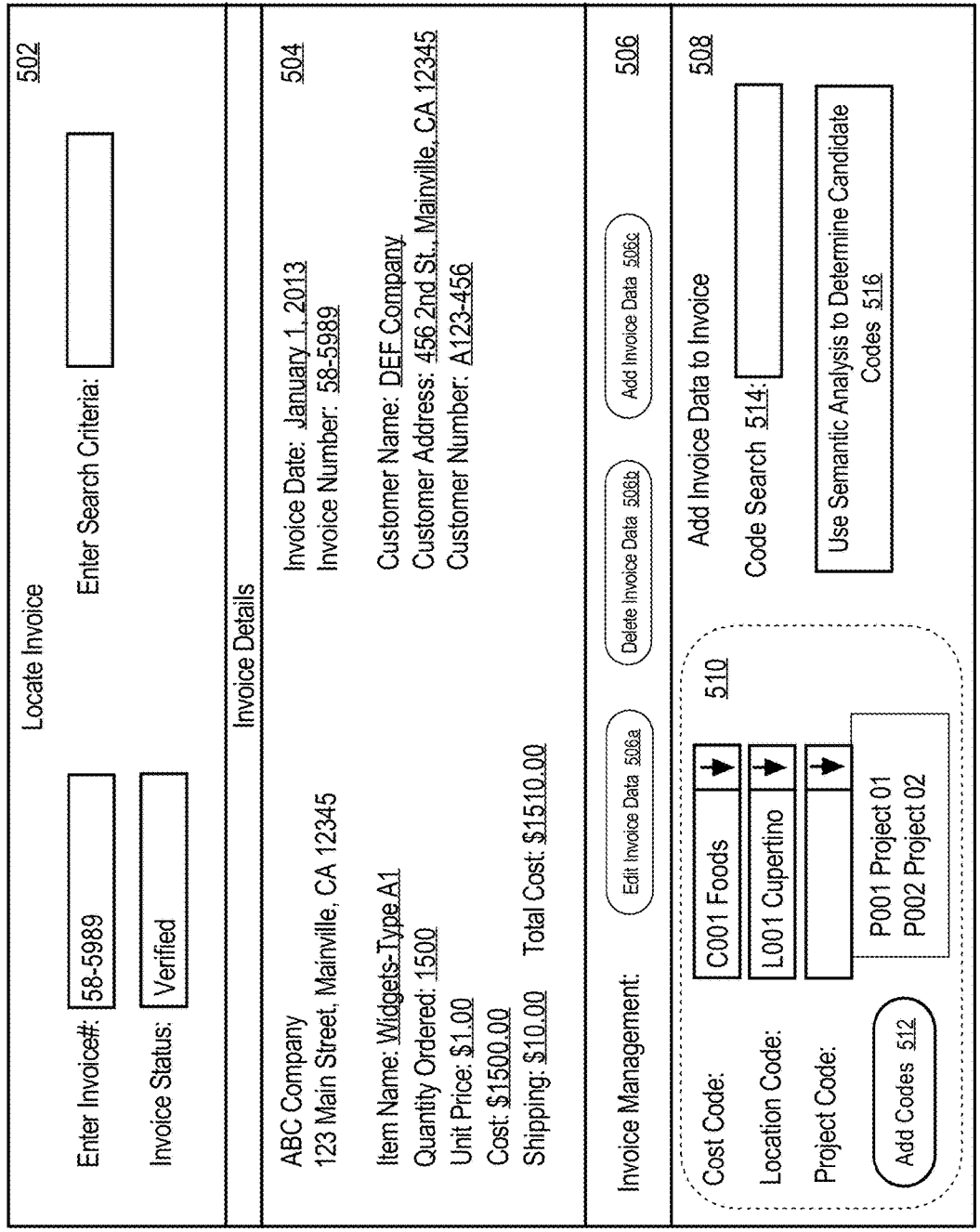

FIG. 6

| User ID | Cost Code | Location Code | Project Code |
|---|---|---|---|
| User01 | C001 Foods<br>C002 Beverage | L001 Cupertino | P0001 Project01 |
| User02 | All | L001 Cupertino<br>L002 Torrance | P0001 Project01<br>P0002 Project02 |
| User03 | C101 Chemicals<br>C105 Dyes<br>C108 Adhesives | L005 Las Vidas<br>L007 Los Angeles<br>L102 Los Alamos | P0016 Project16<br>P0018 Project18<br>P0101 Project101 |

FIG. 7
Semantic Analysis Candidate Code Table

| User ID | Invoice Feature | Cost Code | Location Code | Project Code |
|---|---|---|---|---|
| User01 | Vendor Name = "AAA"<br>"Food" | C001 Foods | L001 Cupertino | P0001 Project01 |
| User02 | Vendor Name = "BBB"<br>"Drink" | C002 Beverage | L002 Torrance | P0002 Project02 |

PROCESSING ELECTRONIC DATA ACROSS NETWORK DEVICES

RELATED APPLICATION AND CLAIM OF PRIORITY

This application is a Continuation of prior U.S. patent application Ser. No. 14/042,291 entitled "Purchase Order Matching," filed Sep. 30, 2013, the entire contents of which is hereby incorporated by reference as if fully set forth herein for all purposes.

FIELD OF THE INVENTION

Embodiments relate to processing electronic data across network devices. SUGGESTED GROUP ART UNIT: 2184; SUGGESTED CLASSIFICATION: 710.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Despite the proliferation of electronic accounting systems, some aspects of accounting are still performed manually. For example, when a business organization issues purchase orders for products or services and receives invoices from a vendor, the invoices are sometimes manually verified. For example, accounting department personnel may access a purchase order system and compare product or service description, quantity and price information on a printed invoice to data stored in a purchase order system. If all of the data matches, then the invoice is approved for payment and data from the invoice is entered into an accounting system to enable payment to be made to the vendor. If some of the data on the invoice does not match corresponding data in the purchase order system however, then the invoice is designated as requiring special processing. Special processing may take many forms, depending upon a particular situation. For example, in a situation where an invoice indicates that 100 ordered items were delivered, but the purchase order system indicates that only 80 of the ordered items were delivered, then payment for delivery of the 80 ordered items may be authorized, but not for the remaining 20 items not yet delivered. Manual verification of invoices is labor intensive and prone to error.

SUMMARY

An approach for processing electronic data across network devices includes retrieving image data that represents an electronic document. One or more text fields that are represented in the image data are obtained from the image data. The one or more text fields represented in the image data are verified by comparing the one or more text fields to data from a first external system accessible via one or more networks. In response to determining that the one or more text fields represented in the image data do not match the data from the first external system, then the one or more text fields represented in the image data are designated for special processing. In response to determining that the one or more text fields represented in the image data match the data from the first external system, then the electronic document is designated as verified and user interface data is generated and provided to a client device. When processed at the client device, the user interface data allows a user to add one or more additional text fields to the one or more text fields to generate revised text field data. The revised text field data is transmitted, via the one or more networks, to a second external accounting system for processing. The approach may be implemented by instructions stored on one or more computer-readable media, by one or more devices, or by one or more computer-implemented methods.

BRIEF DESCRIPTION OF THE DRAWINGS

In the drawings:

FIG. 1 is a block diagram that depicts an arrangement for verifying electronic documents.

FIG. 2 is a flow diagram that depicts and approach for automatically verifying electronic documents using purchase order data.

FIGS. 3A-3D depict an example graphical user interface generated by a verification process that allows a user to view information about and/or participate in the verification processing.

FIG. 4 is a message ladder diagram that depicts an example exchange of messages between the elements of FIG. 1 to verify electronic document data.

FIG. 5 depicts an example user interface for managing electronic document data.

FIG. 6 is a block diagram that depicts a table of user-specific code data.

FIG. 7 is a block diagram that depicts a semantic analysis candidate code table used with semantic analysis.

DETAILED DESCRIPTION

Figure 8:
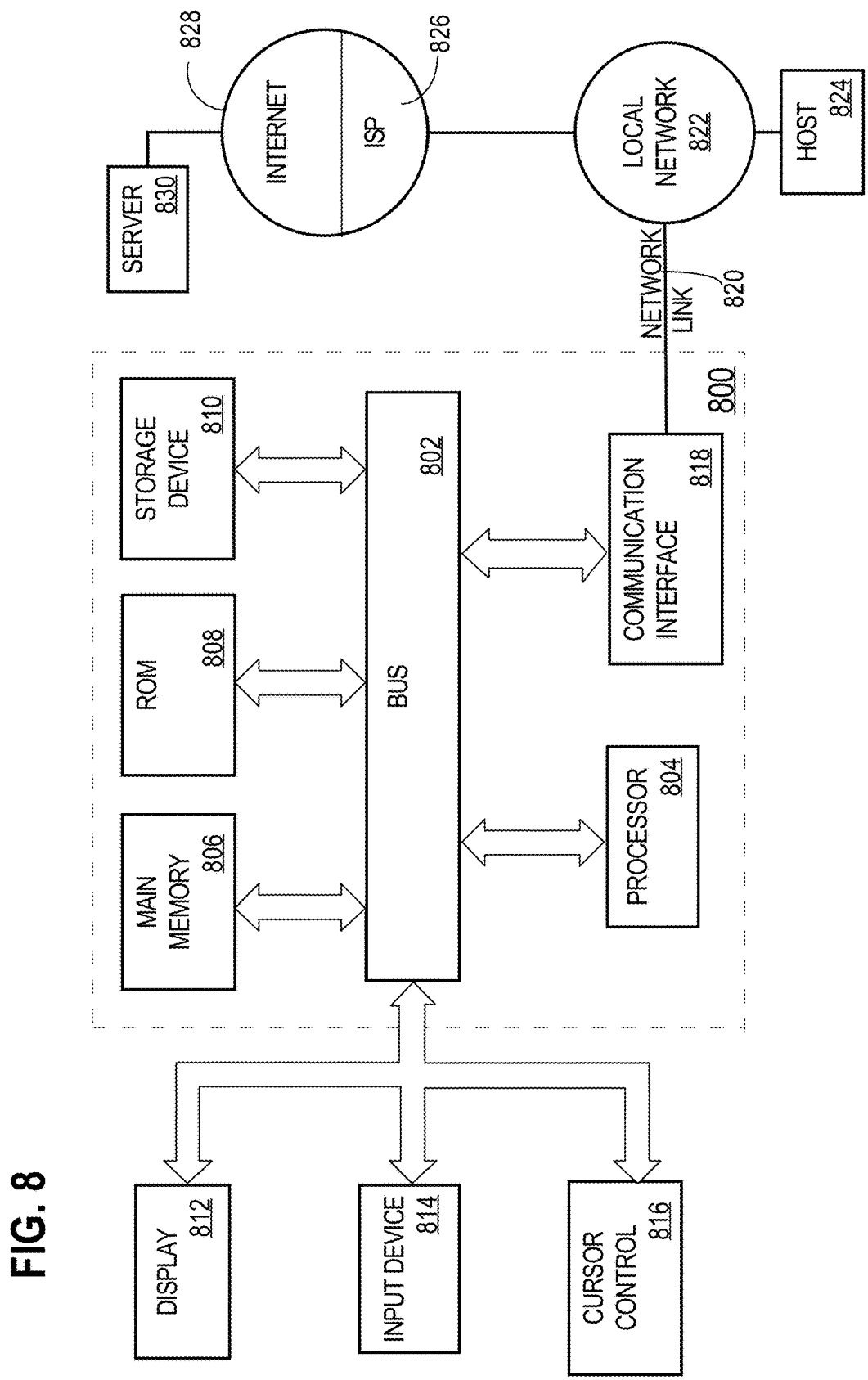
FIG. 8 is a block diagram that depicts a computer system upon which an embodiment may be implemented.

In the following description, for the purposes of explanation, numerous specific details are set forth in order to provide a thorough understanding of the embodiments. It will be apparent, however, that the embodiments may be practiced without these specific details. In other instances, well-known structures and devices are shown in block diagram form in order to avoid unnecessarily obscuring the embodiments.

I. OVERVIEW
II. SYSTEM ARCHITECTURE
III. ELECTRONIC DOCUMENT VERIFICATION
IV. SUPPLEMENTING ELECTRONIC DOCUMENT DATA
V. CORRECTING DATA
VI. IMPLEMENTATION MECHANISMS

I. Overview

An approach is provided for processing electronic documents that includes the use of data from an external system to verify information on the electronic documents. Image data that represents an electronic document is received and one or more text fields represented in the image data are obtained. The one or more text fields represented in the image data are compared to from a first external system. If the one or more text fields represented in the image data do not match the data from the first external system, then the one or more text fields represented in the image data are designated for special processing. If the one or more text fields represented in the image data match the data from the first external system, then the electronic document is designated as verified and the one or more text fields are transmitted to a second external system for processing. This approach allows electronic document data to be automatically verified using information from an external system, which may reduce the amount of human labor required to verify electronic documents and reduce the number of errors. The approach may also reduce costs associated with manual entry of data into external systems. The approach also includes the ability for a user to supplement electronic document data with additional data, such as codes used by business organizations. In addition, the approach provides for the automatic correction of errors in the one or more text fields using data maintained by the first external system.

II. System Architecture

FIG. 1 is a block diagram that depicts an arrangement 100 for verifying electronic documents. Arrangement 100 includes an arrangement 102 of example electronic systems of a business organization and a vendor 104. In the following examples, the business organization is purchasing goods and/or services from the vendor 104. In the example depicted in FIG. 1, vendor 104 includes vendor processes 106 and local storage 108. Vendor processes 106 include, for example, a purchase order process for processing purchase orders, an invoice process for generating invoices, an inventory management process, etc. Local storage 108 may include any type of volatile or non-volatile storage that may vary depending upon a particular implementation. Vendor 104 may include other elements and processes, depending upon a particular implementation.

In the example depicted in FIG. 1, arrangement 102 includes a purchase order (PO) system 110, an accounting system 112 and a human resources (HR) system 114. Arrangement 102 may include additional elements and processes or fewer elements and processes than those depicted in FIG. 1, depending upon a particular implementation and the approaches described herein are not limited to any particular electronic systems of a business organization. PO system 110 includes one or more purchase order processes 116 and local storage 118. Purchase order processes 116 are configured to generate purchase orders for goods and/or services purchased by the business organization and to allow entry of various data related to purchase orders. For example, purchase order processes 116 may provide a graphical user interface that allows entry of information pertaining to purchase orders, such as purchase order information, purchase order status information, purchase order approval information, etc. Local storage 118 may include any type of volatile or non-volatile storage for storing purchase order and other information. Accounting system 112 includes one or more accounting processes 120 and local storage 122. Accounting processes 120 are configured to process invoices and provide for payment of vendor invoices. Accounting processes 120 may include a wide variety of other processes, depending upon a particular arrangement, for example, accounts payable and accounts receivable processes. HR system 114 includes one or more human resources processes 124 and local storage 126. Human resources processes 124 may include a wide variety of human resources processes that may vary depending upon a particular implementation and the approaches described herein are not limited to any particular type of human resources processes.

Arrangement 102 includes an invoice verification system 128 that includes an invoice verification process 130, a coding process 132, a correction process 134 and local storage 136. As described in more detail hereinafter, invoice verification system 128 is configured generally to verify electronic invoice data using data from PO system 110. This may include determining whether particular text fields identified in electronic invoice data are correct with respect to data maintained by PO system 110. Electronic invoices that have text fields that are determined to be correct by the invoice verification system 128 are designated as verified and provided to accounting system 112 for processing. Electronic invoices that have text fields that are determined to not be correct by invoice verification system 128 are designated for special processing. Coding process 132 allows additional data to be added to invoice data and correction process 134 allows incorrect invoice data to be automatically corrected based upon purchase order data from purchase order system 110. These processes are each described in more detail hereinafter. Invoice verification process 130, coding process 132 and correction process 134 are depicted in the figures and described herein as being separate for purposes of discussion only and these processes may be implemented in any number of processes, including a single process.

As described in more detail hereinafter, data capture process 138 is configured to process electronic invoice data, for example, invoice image data, and identify one or more text fields represented in the electronic invoice data. For example, vendor 104 may generate paper invoices that are scanned, for example, by a scanner or multi-function peripheral (MFP), to generate electronic invoice data that is provided to data capture process 138. Alternatively, vendor 104 may generate invoices in electronic form and in this situation, the electronic invoice data is provided by vendor 104 to data capture process 138. Although depicted in FIG. 1 as a single process for purposes of explanation only, data capture process 138 may comprise any number of processes, depending upon a particular implementation. For example, data capture process 138 may include, as one example, an optical character recognition process for converting invoice image data into text data. According to one embodiment, data capture process 138 includes a data capture engine for identifying text fields in invoice image data. One such example is Abbyy Flexicapture, by ABBYY USA.

The various elements and processes depicted in FIG. 1 may communicate with each other via direct communications links or via one or more wired or wireless networks, for example, one or more local area networks (LANs), wide area networks (WANs) or other networks, including the Internet. Communications between the elements depicted in FIG. 1 may be made using secure communications. In addition, the various elements and processed depicted in FIG. 1 may execute on a common computing platform and computing device, or on different computing platforms and computing devices, depending upon a particular implementation. As one example, data capture process 138 and invoice verification system 128 may be integrated into PO system 110 and/or accounting system 112. As another example, data capture process 138 and invoice verification system 128 may be implemented in a network and accessed as a network service, for example, as a cloud service or cloud application.

III. Electronic Document Verification

FIG. 2 is a flow diagram 200 that depicts an approach for automatically verifying electronic documents using purchase order data, according to an embodiment. Reference is also made to elements depicted in FIG. 1. In this example, it is presumed that a business entity "ABC" has ordered, from vendor 104, 100 widgets at a price of $1.00 per widget and has issued a purchase order 140 to vendor 104 for the widgets. Various electronic systems of ABC are represented by arrangement 102. The purchase order 140 may be in paper form or electronic form. Vendor 104 has delivered the 100 widgets to ABC and issued to ABC an invoice for the 100 widgets. The invoice references ABC's purchase order number and also identifies the 100 widgets at a price of $1.00 each, a shipping charge of $5, and a total charge of $105.

In step 202, invoice image data 142 is obtained that represents the invoice issued by vendor 104. The invoice image data may be generated based upon a paper invoice issued by vendor 104 that is then scanned, for example, by a scanner or multi-function peripheral (MFP). Alternatively, vendor 104 may have issued an electronic invoice.

In step 204, text fields are retrieved from the invoice image data. For example, data capture process 138 may process the invoice image data 142 to retrieve one or more text fields contained in the invoice image data. This may include various types of processing, such as OCR processing and data capture processing. In this example, data capture process 138 identifies text fields in the invoice image data. The particular text fields identified in invoice image data may vary depending upon a particular implementation and the approaches described herein are not limited to any particular text fields. Example text fields include, without limitation, vendor name, invoice number, invoice date, purchase order number, item name, item quantity, item price, shipping charge, total charge, other line items, etc. Data capture process 138 may provide invoice and text field data 144 to the invoice verification system 128.

In step 206, the text fields retrieved from the invoice image data are compared to purchase order data. This may include comparing values contained in text fields to purchase order data from PO system 110. The invoice verification system 128 may obtain purchase order data 146 from PO system 110, for example, by requesting purchase order data 146 for the purchase order number or invoice number obtained by data capture process 138 from the invoice image data 142. The invoice verification system 128 then compares the purchase order data obtained from PO system 110 to the values contained in the text fields obtained by the data capture process 138.

In step 208, a determination is made whether any mismatches exist between the text fields obtained from the invoice image data and the purchase order data obtained from the PO system 110. In this example, a "mismatch" may occur when one or more text fields obtained from the invoice image data do not match corresponding data in the purchase order data obtained from the PO system 110. For example, the value of a quantity obtained by data capture process 138 from the invoice image data 142 may not match the quantity for the purchase order 140 issued by PO system 110. This may be determined, for example, by comparing the value of the quantity obtained by data capture process 138 from the invoice image data 142 to the quantity for the purchase order 140 as indicated by purchase order data 146. This type of mismatch indicates that there is a discrepancy in the quantity of widgets that ABC ordered and for which ABC was invoiced by vendor 104. In some embodiments, a mismatch may be determined to exist when at least a specified number of data items, i.e., text fields, do not match the corresponding data from the PO system 110. In other embodiments, priorities or designations may be assigned to invoice data and a mismatch determined when one or more text fields having a specified priority or designation do not match corresponding data obtained from the PO system 110. For example, text fields such as quantity, price and total cost may be assigned the highest priority or be assigned a special designation, so that if any of these text fields do not match the corresponding data obtained from the PO system 110, then a mismatch is determined to exist. Other text fields, for example, a general information field or other non-essential information fields may be assigned a lower priority, such that if these fields do not match the corresponding data obtained from the PO system 110, then a mismatch will not necessarily be determined to exit.

The comparing of the text fields retrieved from the invoice image data to the purchase order data may be performed automatically by invoice verification system 128, for example, by invoice verification process 130. FIGS. 3A-3D depict an example graphical user interface generated by invoice verification process 130 that allows a user to view information about and/or participate in the verification processing. FIG. 3A is a diagram that depicts a portion of a graphical user interface that displays a table of data that has been obtained by data capture process 138 from invoice image data 142. The table depicted in FIG. 3A includes data for multiple invoices and includes, a purchase order number, an invoice number, an invoice date, a total amount and a freight cost. FIG. 3B is a diagram that depicts a table of purchase order data maintained by PO system 110. The table depicted in FIG. 3B includes data for multiple purchase orders and includes, a purchase order number, a unit price, a quantity and a total amount. The purchase order data may also include a description and part #, although this information is not included in the table of FIG. 3B for purposes of explanation. FIG. 3C is a diagram that depicts a matching matrix that is configured to reconcile invoice data obtained by the data capture process 138 using purchase order data from PO system 110. The diagram of FIG. 3C does not include any results of the reconciliation because reconciliation has not yet been requested. In this example, a graphical user interface object in the form of a Reconcile 302 button is provided. Upon selection of the Reconcile 302 button, reconciliation is performed and the results are displayed, as depicted in FIG. 3D. In FIG. 3D, the matching matrix has been populated with the results of reconciling invoice data obtained by the data capture process 138 using purchase order data from PO system 110. As depicted in FIG. 3D, no mismatches have been determined for some of the invoices, as indicated by a Match value of "MATCH". Invoices for which one or more data items obtained by data capture process 138 do not match purchase order data from PO system 110 have a Match value of "NO". As described in more detail hereinafter, invoices that are determined to not have any mismatches, as indicated by the Match value of "MATCH", are provided to the accounting system 112 for processing. Invoices that are determined to have one or more mismatches, as indicated by the Match value of "NO", are identified for special processing, as described in more detail hereinafter.

If, in step 208, a determination is made that no mismatches exist, then in step 210, systems are updated in response to this determination. This may include updating various systems, depending upon a particular implementation, and the approaches described herein are not limited to updating any particular type of system. As one example, the invoice data 148 obtained from the invoice image data 142 may be provided to accounting system 112. This eliminates manual entry of invoice data from a printed invoice, which can reduce costs and reduce the likelihood of errors attributable to manual data entry. As another example, a status of the purchase order may be updated in the PO system 110, the accounting system 112, or both the PO system 110 and the accounting system 112. As one example, the status of the purchase order may be changed to "billed". Accounting system 112 may also make payment 150 to the vendor 104. The invoice image data may also be provided to the accounting system 112.

If, in step 208, a determination is made that one or more mismatches exist, then in step 212, the one or more text fields are designated for special processing. This may include, for example, invoice verification system 128 generating and providing to PO system 110 special processing data 152. Special processing data 152 may identify an invoice and text fields that did not match the corresponding data obtained from the PO system 110 to allow corrective action to be taken by accounting personnel. Example corrective actions include, without limitation, requesting the vendor 104 to issue a corrected invoice, correcting any mismatches on the invoice, or changing purchase order data maintained by the PO system 110. Other example corrective actions include, without limitation, determining whether a separate purchase order (and corresponding invoice) should be generated for a portion of goods and/or services that were received. Corrective action may also include, for example, generating and transmitting an email or other type of message notification to notify one or more recipients that a mismatch exists for a particular invoice. Results of the comparison made in Step 206 may be recorded, for example, in report data stored on local storage 136. The report data may indicate that no mismatches were found, or in situations where mismatches are identified, the report data may indicate the particular mismatches that were identified. For example, the report data may specify particular text fields where mismatches occurred.

FIG. 4 is a message ladder diagram 400 that depicts an example exchange of messages between the elements of FIG. 1 to verify electronic document data according to an embodiment. As in the prior example, this example assumes that the business entity ABC has ordered widgets from vendor 104. In step 402, ABC generates and provides a purchase order to vendor 104. Vendor 104 delivers the widgets to ABC and generates an invoice. In step 404, invoice image data is provided to ABC and processed by the data capture process 138. This may occur in several ways, depending upon the type of invoice generated by the vendor 104. For example, if vendor 104 generates a paper invoice, then the paper invoice may be scanned by a scanner or MFP to generate invoice image data. Alternatively, vendor 104 may generate and provide to ABC invoice image data. Embodiments are not limited to situations in which the invoice image data is provided directly from vendor 104 to the data capture process 138. Invoice image data may be stored on a network service and then retrieved by the data capture process 138 from the network service. For example, paper invoices may be scanned and the invoice image data stored at a particular network service or at a network storage location. Alternatively, vendor 104 may generate invoice image data and cause the invoice image data to be stored at the particular network service or at the network storage location. Data capture process 138 then retrieves the invoice image data from the particular network service or from the network storage location. One example of a network storage location is a particular server within a business organization.

In step 406, the data capture process 138 processes the invoice image data to obtain text fields contained in the invoice image data, as previously described herein. In step 408, data capture process 138 provides the invoice and text field data to the invoice verification system 128. In step 410, invoice verification system 128 generates and transmits to PO system 110 a request for PO data. In response to the request, in step 412, the PO system 110 provides PO data to invoice verification system 128. The request includes sufficient information for the PO system 110 to provide the PO data to the invoice verification system 128. For example, the request may include a purchase order number obtained by the data capture process 138 from the invoice image data in step 406. If the purchase order number is not available, or simply as an alternative, it may be possible for the request to use other information obtained from the invoice image data. For example, information that identifies the ordered product or service, quantity and price may be included in the request and used by the PO system 110 to identify a corresponding purchase order.

In step 414, mismatches are identified. As previously described herein, invoice verification system 128 compares one or more data in the purchase order data received from the PO system 110 to the text field data obtained by the data capture process 138 to determine whether a mismatch exists between the invoice issued by the vendor 104 and the purchase order data maintained by ABC.

If no mismatches are identified, then in step 416, the invoice verification system 128 provides invoice data to the accounting system 112. The invoice data may include the invoice image data, as well as the text data, e.g., text fields, obtained by data capture process 138 in step 406. The invoice data does not necessarily have to be provided directly from invoice verification system 128 to the accounting system 112. For example, invoice verification system 128 may cause the invoice data to be stored at a particular network service or at a network storage location, which may be the same or different than the network service or network storage location use to store the invoice image data, as previously described herein. Accounting system 112 then retrieves the invoice data from the particular network service or from the network storage location. In step 418, the accounting system 112 makes a payment of the invoice to the vendor 104. As previously described herein, in the situation where no mismatches are identified, then other functionality may also be performed. For example, a status of the purchase order may be updated, e.g., changed to "billed," in the PO system 110, the accounting system 112, or both the PO system 110 and the accounting system 112. As one example, the status of the purchase order may be changed to "billed".

If mismatches are identified, then in step 420, special processing data is generated and provided to the PO system 110. As previously described herein, the special processing data may identify an invoice and text fields that did not match the corresponding data obtained from the PO system 110 to allow investigation by accounting personnel.

IV. Supplementing Electronic Document Data

Invoice verification system 128 may be configured to allow users to manage invoice data, including adding data to invoice data. The added data may replace inaccurate or incomplete invoice data, or may supplement existing invoice data. For example, the invoice image data 142 from vendor 104 or the invoice and text field data 144 from data capture process 138 may contain inaccurate or incomplete invoice data, or may be missing some invoice data.

According to one embodiment, coding process 132 is configured to provide a user interface to manage invoice data 148. FIG. 5 depicts an example user interface 500 for managing electronic document data. Coding process 132 may generate user interface 500 using a wide variety of techniques that may vary depending upon a particular implementation. For example, a client device may be configured with a client component that interacts with coding process 132. As another example, coding process 132 may implement user interface 500 by one or more Web pages that are provided to a Web browser executing on a client device.

User interface 500 may be accessed via a client device that interacts with coding process 132. User interface 500 includes an area 502 with user interface controls for locating an invoice. The user interface controls allow a user to enter an invoice number and view the invoice status as well as details of the invoice in an invoice details area 504. In the present example, a user has entered the invoice number "58-5989" and coding process 132 has obtained and displayed the current invoice status "Verified" and details of the invoice in an invoice details area 504. The user interface controls in area 502 also include a search tool "Enter Search Criteria:" that allows a user to search for an invoice by entering information that might be contained on an invoice. For example, a user might enter a particular item name and a results box is displayed identifying invoices that include the particular item name. An entered invoice number or other search criteria may be applied against invoice data stored on local storage 136, or against invoice data stored at another location external to arrangement 102. For example, an entered invoice number or other search criteria may be applied against invoice data stored in a database accessible by coding process 132 over one or more networks.

As depicted in FIG. 5, the invoice details displayed in invoice details area 504 include the name and address of the vendor "ABC Company," an invoice date, invoice number, item name, quantity ordered, unit price, cost, shipping costs and total cost. The invoice details also include information about the customer, including customer name, address and customer number. The invoice details depicted in FIG. 5 are provided for explanation purposes and embodiments are not limited to the particular invoice details depicted in FIG. 5.

User interface 500 includes an invoice management area 506 that includes controls for managing invoice data. In the example depicted in FIG. 5, the controls include Edit Invoice Data 506a, Delete Invoice Data 506b and Add Invoice Data 506c. Selecting the Edit Invoice Data 506a control allows a user to edit invoice data in invoice details area 504, for example, by selecting and editing fields in invoice details area 504. Selecting the Delete Invoice Data 506b control allows a user to delete invoice data in invoice details area 504, for example, by selecting and deleting fields in invoice details area 504. Selecting either the Edit Invoice Data 506a control or the Delete Invoice Data 506b control may cause additional user interface objects, for example dialog boxes and user interface controls, to be displayed to provide the requested functionality.

Selecting the Add Invoice Data 506c control causes area 508 to be displayed. Area 508 includes a set of controls 510 for adding various codes to invoice data. In the example depicted in FIG. 5, the codes include cost codes, location codes and project codes, but these particular code types are provided for explanation purposes and embodiments are not limited to these particular codes. In this example, the cost code specifies a cost type or a cost category of the goods or services purchased. The location code specifies a location of the customer, which may refer to an actual physical location of the customer or a logical location associated with the customer, such as a building name or an area within a building. The project code specifies a project of the customer to which the purchased goods or services correspond. For example, a particular customer may purchase goods or services for multiple projects and the project code identifies a particular project of the customer with which the purchased goods and services are associated or belong. Examples of other codes include, without limitation, Standard Industrial Codes (SICs), project codes, such as CIS codes, other standardized codes and cost codes associated with a particular industry or business organization. Controls 510 allow a user to select from pull-down lists, a cost code, a location code and a project code. The code values made available to users in controls 510 may be obtained from a code database. The code database may be maintained by invoice verification system 128 or may be maintained by a third party external to arrangement 102. An Add Codes control 512 causes the codes selected by the user to be added to the invoice data. For example, text data for the codes selected by the user may be added to the invoice data.

The code values made available in controls 510 may be user specific. That is, the particular code values made available via the pull-down menus in controls 510 may be selected for a particular user from a plurality of code values. The identity of a user may be established, for example, when a user accesses coding process 132, e.g., by supplying a user ID to access coding process 132. The selection of code values for a particular user may be based upon a wide variety of factors that may vary depending upon a particular implementation and embodiments are not limited to any particular factors. Example factors include, without limitation, code history of the user, employment duties of the user or pre-specified codes for the user. For example, coding process 132 may maintain, for each user, a code history that includes the codes of invoices that each user accessed via user interface 500 and codes previously selected by each user via controls 510. Coding process 132 may maintain a list of codes for a user based upon the employment duties of the user. For example, suppose that a particular user employed by Company X is responsible for working with vendors for a particular set of products and services purchased by Company X, from a plurality of products and services purchased by Company X. Coding process 132 may maintain, for the particular user, a list of codes associated with the particular set of products and services. Pre-specified codes for users may include codes that the users are likely to select when accessing invoice data. Pre-specified codes may be determined, for example, based upon products and services typically purchased by business organizations for which the users are accessing invoice data. Providing user-specific code values via controls 510 may provide a more favorable user experience by reducing the number of code values that a user must navigate and by eliminating code values that a user is not likely to select.

FIG. 6 is a block diagram that depicts a table 600 of user-specific code data. Table 600 includes user-specific code data for three users identified in table 600 as "User01", "User02" and "User03". Each row of table 600 corresponds to a particular user and specifies cost code, location code and project code values for the corresponding user. The values in table 600 may be used to populate the pull-down menus in controls 510.

Area 508 also includes a code search tool 514 that allows a user to search for particular codes. For example, a user may enter the term "Foods" into code search tool 514 and search results may be displayed to the user that include the code "C001 Foods". Searching for additional information, such as codes, to be added to invoice data may also be achieved using a semantic analysis search. Area 508 includes a control 516 for initiating a search for candidate codes using semantic analysis. According to one embodiment, the semantic analysis determines candidate codes based upon data contained in the invoice data. The semantic analysis may use text, such as a vendor name, item name, etc., to identify one or more candidate codes that are presented to the user via one or more graphical user interface objects.

FIG. 7 is a block diagram that depicts a semantic analysis candidate code table 700 used with semantic analysis. Each row of table 700 includes a column with one or more invoice features and columns for one or more cost codes, one or more location codes and one or more project codes that correspond to the one or more invoice features. The invoice features may be used to search invoice data. According to one embodiment, the invoice features are used to construct one or more queries that are processed against invoice data, such as the invoice data displayed in areas 504. For example, suppose that a user enters an invoice number in area 502 and invoice details are displayed in invoice details area 504. The candidate code values provided in controls 510 may be obtained by performing a search for invoice features in table 700 and when a match is determined, using the corresponding cost codes, location codes and projects codes from table 700 to populate the values in controls 510. For example, if the invoice data displayed in invoice details area 504 includes a vendor name of "ABC" or includes the term "Food", then the cost code, location code and project code from the first row of table 700 are used to populate the values in controls 510. More specifically, the Cost Code pull-down menu would include the "C001 Foods" cost code, the Location Code pull-down menu would include the "L001 Cupertino" location code and the Project Code pull-down menu would include the "P0001 Project01" project code.

The use of semantic analysis to identify candidate codes is helpful for identifying candidate codes that are relevant to a particular invoice, instead of requiring a user to review large numbers of candidate codes, many of which might be unrelated to a particular invoice of interest. For example, referring to the invoice data contained in invoice details area 504, the use of semantic analysis is helpful in identifying candidate codes for controls 510 that are relevant to the Widgets-Type A1 sold by ABC Company to DEF Company. This provides a more favorable user experience by automatically populating the code values displayed in controls 510 with code values that are relevant to the invoice data displayed in invoice details area 504, namely, Widgets-Type A1 sold by ABC Company to customer DEF Company. The use of semantic analysis to identify candidate codes may be used to identify an exclusive set of candidate codes to display in controls 510, meaning that other codes not identified using semantic analysis will not be included in the pull-down menus. Alternatively, semantic analysis may be used in other ways. According to one embodiment, the codes identified using semantic analysis may be included in pull-down menus ahead of, or on top of, other codes. So, although a large number of codes may be made available to users via pull-down menus, the codes determined using semantic analysis are presented first in the pull-down menus.

Semantic analysis may also be optionally performed on a user-specific basis. As depicted in FIG. 7, the data contained in semantic analysis candidate code table 700 may be organized on a per-user basis. In this example, when User01 requests that semantic analysis be used to determine candidate codes by selecting control 516, the codes in the first row of table 700 are used when the invoice features Vendor Name="AAA" or the term "Food" is found in the invoice data in invoice details area 504. When User02 requests that semantic analysis be used to determine candidate codes by selecting control 516, the codes in the second row of table 700 are used when the invoice features Vendor Name="BBB" or the term "Drink" is found in the invoice data in invoice details area 504. Note that this approach allows the particular invoice features that are used by semantic analysis to identify candidate codes may be tailored to a particular user, for example, based upon selection history, employment duties, etc., as previously described herein. The use of user-specific semantic analysis may provide further enhancements to the user experience by further improvements to relevancy to a particular user.

V. Correcting Data

In some situations, the invoice and text field data 144 generated by data capture process 138 may be incomplete or contain errors. This may occur for a wide variety of reasons, for example, that the invoice image data 142 is missing data, includes incorrect data, or that the invoice image data 142 has been corrupted. According to one embodiment, invoice and text field data 144 may be automatically corrected based upon purchase order data 146 from PO system 110. For example, suppose that the invoice and text field data 144 contains a purchase order number that exactly matches a purchase order number maintained by PO system 110. This this example, there is an exact match between the purchase order number contained in the invoice and text field data 144 and a purchase order number maintained by PO system 110, but embodiments are not limited to situations in which an exact match occurs. In situations where a near match exists, other information from the invoice and text field data 144 and PO system 110 may be used to confirm that the invoice numbers are the same. For example, invoice date, item name, item quantity, etc., from the invoice and text field data 144 may be compared to corresponding data maintained by PO system to confirm a match of purchase order numbers.

Once the invoice and text field data 144 has been positively associated with a particular invoice, then information maintained by PO system 110 may be used to automatically correct data contained in the invoice and text field data 144. For example, suppose that invoice and text field data 114 includes the vendor name "ABC Company" but that the vendor name maintained by PO system 110 for that invoice is "A.B.C. Company." In this situation, correction process 134 may automatically change the vendor name from "ABC Company" to "A.B.C. Company" in the invoice data 148 provided to accounting system 112. In this example, the replacement of the vendor name may be made in response to any differences existing between the vendor name included in the invoice and text field data 144 and the vendor name maintained by PO system 110. In other situations, the replacement of the vendor name may be made in response to the differences existing between the vendor name included in the invoice and text field data 144 and the vendor name maintained by PO system 110 exceed a specified threshold. Although examples are described herein in the context of correcting a vendor name in invoice and text field data 144, embodiments are not limited to correcting vendor names and any data contained in invoice and text field data 144 may be corrected using this approach.

VI. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that depicts a computer system 800 upon which an embodiment may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media for providing an improvement in the processing of image data in computer networks, the one or more non-transitory computer-readable media storing instructions which, when processed by one or more processors, cause:
    retrieving invoice image data that represents an invoice;
    obtaining one or more text fields represented in the invoice image data;
    verifying the one or more text fields represented in the invoice image data by comparing the one or more text fields represented in the invoice image data to purchase order data from a purchase order system;
    in response to determining that the one or more text fields represented in the invoice image data do not match the purchase order data from the purchase order system, then designating the one or more text fields represented in the invoice image data for special processing; and
    in response to determining that the one or more text fields represented in the invoice image data do match the purchase order data from the purchase order system, then:
        designating the invoice as verified,
        generating and transmitting, via one or more computer networks to a client computing device, user interface data which, when processed at the client computing device, displays a user interface on a display of the client computing device that allows a user to add code values to the one or more text fields represented in the invoice image data to generate revised text field data by:
            displaying, on the user interface displayed on the display of the client computing device, one or more candidate code values as user-selectable options which, when selected, cause a corresponding candidate code value, from the one or more candidate code values, to be included in the revised text field data, wherein the one or more candidate code values are determined based upon semantic analysis performed on the one or more text fields represented in the invoice image data, and
        transmitting the revised text field data to an accounting system for processing.

2. The one or more non-transitory computer-readable media of claim 1, wherein the one or more additional text fields include one or more of a cost code, a location code or a project code.

3. The one or more non-transitory computer-readable media of claim 1, further storing additional instructions which, when processed by the one or more processors, causes:
    storing, as invoice data in association with invoice identification data that uniquely identifies the invoice, the one or more text fields represented in the invoice image data, and
    generating and transmitting, via the one or more computer networks to the client computing device, additional user interface data which, when processed at the client computing device, allow a user to search for and retrieve, based upon the invoice identification data that uniquely identifies the invoice, the one or more text fields represented in the invoice image data.

4. The one or more non-transitory computer-readable media of claim 1, further storing additional instructions which, when processed by the one or more processors, causes:
    generating and transmitting, via the one or more computer networks to the client computing device, additional user interface data which, when processed at the client computing device, allow a user to search for one or more candidate code values, wherein selection of a particular candidate code value from the one or more candidate code values causes the particular candidate code value to be included in the revised text field data.

5. The one or more non-transitory computer-readable media of claim 1, further storing additional instructions which, when processed by the one or more processors, causes:
    in response to determining that a particular text field represented in the invoice image data does not match the purchase order data from the purchase order system, then automatically correcting the particular text field based upon corresponding data from the purchase order system.

6. The one or more non-transitory computer-readable media of claim 1, further storing additional instructions which, when processed by the one or more processors, causes:
    in response to determining that differences between a particular text field represented in the invoice image data and corresponding data in the purchase order data from the purchase order system exceed a threshold, then automatically correcting the particular text field based upon corresponding data from the purchase order system.

7. The one or more non-transitory computer-readable media of claim 1, wherein:
    the semantic analysis is performed based upon data that is specific to the user, and
    the one or more candidate code values are specific to the user.

8. An apparatus for providing an improvement in the processing of image data in computer networks, the apparatus comprising:
    one or more processors; and
    one or more memories storing instructions which, when processed by the one or more processors, cause:
        retrieving invoice image data that represents an invoice;
        obtaining one or more text fields represented in the invoice image data;
        verifying the one or more text fields represented in the invoice image data by comparing the one or more text fields represented in the invoice image data to purchase order data from a purchase order system;
        in response to determining that the one or more text fields represented in the invoice image data do not match the purchase order data from the purchase order system, then designating the one or more text fields represented in the invoice image data for special processing; and in response to determining that the one or more text fields represented in the invoice image do data match the purchase order data from the purchase order system, then:

designating the invoice as verified, generating and transmitting, via one or more computer networks to a client computing device user interface data which, when processed at the client computing device, displays a user interface on a display of the client computing device that allows a user to add code values to the one or more text fields represented in the invoice image data to generate revised text field data by:

displaying, on the user interface displayed on the display of the client computing device, one or more candidate code values as user-selectable options which, when selected, cause a corresponding candidate code value, from the one or more candidate code values, to be included in the revised text field data, wherein the one or more candidate code values are determined based upon semantic analysis performed on the one or more text fields represented in the invoice image data, and transmitting the revised text field data to an accounting system for processing.

9. The apparatus of claim 8, wherein the one or more additional text fields include one or more of a cost code, a location code or a project code.

10. The apparatus of claim 8, wherein the one or more memories further store additional instructions which, when processed by the one or more processors, causes:

storing, as invoice data in association with invoice identification data that uniquely identifies the invoice, the one or more text fields represented in the invoice image data, and generating and transmitting, via the one or more computer networks to the client computing device, additional user interface data which, when processed at the client computing device, allow a user to search for and retrieve, based upon the invoice identification data that uniquely identifies the invoice, the one or more text fields represented in the invoice image data.

11. The apparatus of claim 8, wherein the one or more memories further store additional instructions which, when processed by the one or more processors, causes:

generating and transmitting, via the one or more computer networks to the client computing device, additional user interface data which, when processed at the client computing device, allow a user to search for one or more candidate code values, wherein selection of a particular candidate code value from the one or more candidate code values causes the particular candidate code value to be included in the revised text field data.

12. The apparatus of claim 8, wherein the one or more memories further store additional instructions which, when processed by the one or more processors, causes:

in response to determining that a particular text field represented in the invoice image data does not match the purchase order data from the purchase order system, then automatically correcting the particular text field based upon corresponding data from the purchase order system.

13. The apparatus of claim 8, wherein the one or more memories further store additional instructions which, when processed by the one or more processors, causes:

in response to determining that differences between a particular text field represented in the invoice image data and corresponding data in the purchase order data from the purchase order system exceed a threshold, then automatically correcting the particular text field based upon corresponding data from the purchase order system.

14. The apparatus of claim 8, wherein:

the semantic analysis is performed based upon data that is specific to the user, and the one or more candidate code values are specific to the user.

15. A computer-implemented method for providing an improvement in the processing of image data in computer networks, the computer-implemented method comprising:

retrieving invoice image data that represents an invoice;

obtaining one or more text fields represented in the invoice image data;

verifying the one or more text fields represented in the invoice image data by comparing the one or more text fields represented in the invoice image data to purchase order data from a purchase order system;

in response to determining that the one or more text fields represented in the invoice image data do not match the purchase order data from the purchase order system, then designating the one or more text fields represented in the invoice image data for special processing; and in response to determining that the one or more text fields represented in the invoice image data do match the purchase order data from the purchase order system, then:

designating the invoice as verified, generating and transmitting, via one or more computer networks to a client computing device, user interface data which, when processed at the client computing device, displays a user interface on a display of the client computing device that allows a user to add code values to the one or more text fields represented in the invoice image data to generate revised text field data by:

displaying, on the user interface displayed on the display of the client computing device, one or more candidate code values displayed as user-selectable options which, when selected, cause a corresponding candidate code value, from the one or more candidate code values, to be included in the revised text field data, wherein the one or more candidate code values are determined based upon semantic analysis performed on the one or more text fields represented in the invoice image data, and transmitting the revised text field data to an accounting system for processing.

16. The computer-implemented method of claim 15, further comprising:

in response to determining that a particular text field represented in the invoice image data does not match the purchase order data from the purchase order system, then automatically correcting the particular text field based upon corresponding data from the purchase order system.

17. The computer-implemented method of claim 15, wherein:

the semantic analysis is performed based upon data that is specific to the user, and the one or more candidate code values are specific to the user.

18. The computer-implemented method of claim 15, wherein the one or more additional text fields include one or more of a cost code, a location code or a project code.

19. The computer-implemented method of claim 15, further comprising:

storing, as invoice data in association with invoice identification data that uniquely identifies the invoice, the one or more text fields represented in the invoice image data, and generating and transmitting, via the one or more computer networks to the client computing device, additional user interface data which, when processed at the client computing device, allow a user to search for and retrieve, based upon the invoice identification data that uniquely identifies the invoice, the one or more text fields represented in the invoice image data.

20. The computer-implemented method of claim 15, further comprising:

in response to determining that differences between a particular text field represented in the invoice image data and corresponding data in the purchase order data from the purchase order system exceed a threshold, then automatically correcting the particular text field based upon corresponding data from the purchase order system.

* * * * *